US009825776B2

(12) United States Patent
Calciu et al.

(10) Patent No.: US 9,825,776 B2
(45) Date of Patent: Nov. 21, 2017

(54) DATA CENTER NETWORKING

(71) Applicant: LENOVO ENTERPRISE SOLUTIONS (SINGAPORE) PTE. LTD., Singapore (SG)

(72) Inventors: Corneliu-Ilie Calciu, Bucharest (RO); Florin Florescu, Bucharest (RO); Radu Mihai Iorga, Bucharest (RO); Sorin Tudor Toderica, Ilfov (RO)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 152 days.

(21) Appl. No.: 14/737,019

(22) Filed: Jun. 11, 2015

(65) Prior Publication Data
US 2016/0366056 A1 Dec. 15, 2016

(51) Int. Cl.
| | |
|---|---|
| *H04L 12/28* | (2006.01) |
| *H04L 12/44* | (2006.01) |
| *H04L 12/721* | (2013.01) |
| *H04L 12/751* | (2013.01) |
| *H04L 12/931* | (2013.01) |
| *H04L 12/761* | (2013.01) |

(52) U.S. Cl.
CPC ............. *H04L 12/44* (2013.01); *H04L 45/02* (2013.01); *H04L 45/66* (2013.01); *H04L 45/16* (2013.01); *H04L 49/351* (2013.01)

(58) Field of Classification Search
CPC ..... H04L 12/54; H04L 12/56; H04L 12/5696; H04L 12/5855
USPC ........ 370/351, 389, 400, 401, 420, 432, 465
See application file for complete search history.

(56) References Cited

U.S. PATENT DOCUMENTS

| | | | |
|---|---|---|---|
| 8,259,726 B2* | 9/2012 | Subramanian | H04L 45/54 370/392 |
| 8,566,257 B2* | 10/2013 | Armstrong | G06F 15/17312 706/12 |
| 8,681,661 B2* | 3/2014 | Narasimhan | H04L 49/356 370/255 |
| 9,160,701 B2* | 10/2015 | Hu | H04L 61/103 |
| 9,215,171 B2* | 12/2015 | Basso | H04L 45/7453 |
| 9,397,943 B2* | 7/2016 | Song | H04L 12/4641 |
| 9,559,952 B2* | 1/2017 | Kapadia | H04L 45/741 |
| 2014/0226666 A1 | 8/2014 | Narasimhan et al. | |

* cited by examiner

*Primary Examiner* — Dmitry H Levitan
(74) *Attorney, Agent, or Firm* — Jason Friday; Andrew M. Calderon; Roberts Mlotkowski Safran Cole & Calderon. P.C.

(57) ABSTRACT

Networking systems and, more particularly, processes of limiting MAC address information in a forwarding table in data center networking systems are provided. The method includes limiting MAC address information in a forwarding table in leaf switches of a local area networking system by learning, for each of the leaf switches, only MAC addresses from directly connected hosts.

20 Claims, 4 Drawing Sheets

DATA CENTER NETWORKING

FIELD OF THE INVENTION

The invention relates to networking systems and, more particularly, to processes of limiting MAC address information in a forwarding table in data center networking systems.

BACKGROUND

A local area network (LAN) is a computer network that interconnects computers within a limited area such a data center, using network media. A LAN includes at least one spine high-capacity Top-of-Rack (TOR) switch, some number of leaf (TOR or embedded) switches, each linked to the spine switches, and each of the leaf switches linked directly to some number of host (servers) devices. In this type of topology, each of the switches in the LAN operate to process and transmit data frames they receive from neighboring LAN devices, and each switch in the LAN builds and maintains a layer-2 (L2) forwarding table that is comprised of MAC address information learned from frames they receive from neighboring LAN devices and the receiving port.

Generally, devices in a network, such as a switch, operate to receive a data frame at an ingress port, process the data frame to determine the destination port that the frame should be sent to (if the switch is not itself the destination) and then send the data frame out an egress port to its intended destination. After the data frame arrives at an ingress port, the switch can examine, among other things, the header in the data frame for information that identifies the destination device to which the data frame is to be sent. This destination information can be the destination MAC address and/or IP address of a host device linked to a switch port, or it can be address information associated with some other device in the network. Each network switch then can use this address information to determine how to forward data frame in the network.

In order for spine and leaf devices to transmit data frames received from any of the other devices in the network to their intended destination, it is necessary for each of these devices to build and maintain a forwarding table that can include MAC address information assigned to each of the host devices comprising the network, or at least address information associated with the destination host devices to which data frames are sent. This address information can be learned using well know network address learning techniques, such as MAC learning.

Ethernet networks have become ubiquitous and are growing in popularity and usage, especially in the Data Center (DC) environment. This popularity is driving the large scale adaptation of Ethernet technology which, in turn, is driving down the cost and increasing the speed at which these networks operate. With the large scale adaptation of Ethernet technology, the number of network devices comprising an Ethernet network is increasing. In addition to the increasingly more numerous physical devices connected to a network, each physical device can be configured to support a number of virtual devices or machines (VM) that operate in conjunction with one or more of the hosts. Each VM can be assigned a unique MAC address, which, depending upon the number of virtual machines in a local network, can result in a large number of MAC addresses being maintained in the forwarding tables of frame switches that are aware of some or all of the virtual machines. It is noteworthy to mention that designing switches with large L2 MAC table capacity increases the cost of the switch and can also increase the power consumption of such switches.

Typically, the frames entering a switch are processed by functionality that has access to a limited amount of on-chip memory on which to store forwarding table information. The requirement to increase the size of these forwarding tables to accommodate a flat MAC addressing scheme becomes untenable even for the high end switches available in the market. As a consequence of building and maintaining flat forwarding tables in the data plane of a network switch, switches typically learn the MAC addresses of all the nodes in the network that they can reach.

But, current MAC learning techniques can result in a network switch storing a very large amount of address information in their forwarding table memory. That is, the forwarding table in a switch can, at any point in time, store one entry for each of the MAC addresses of the devices (physical and/or virtual) that it can communicate with. So, by way of example, in a network including forty two servers per rack, and with each server configured to support twenty VMs, there are over eight hundred addresses per rack. If the network has two hundred such racks, then the total number of MAC addresses that can be learned is very large. However, not all of the address information stored in a forwarding table may be needed by the switch to support the forwarding of data frames from one host device to another host device in the network or to the network core.

One technique that is used to limit the number of addresses that are learned and stored is to remove those addresses from a forwarding table that have not been accessed for some specified period of time. This technique for limiting the number of currently stored addresses can result in storing a number of learned addresses which is much beyond the capacity of most switch memory dedicated for storing forwarding table information. Another approach may be to have switches that are connected directly to host devices in a local network not learn the MAC address of every host device with which it can communicate. This approach, though, does not limit the number of MAC addresses learned from uplink ports and does not provide a good solution for asymmetric data flows. Also this solution needs to configure a timeout period for core facing ports (CFPs) that is shorter than the period configured on non-CFPs, in order to limit the number of MAC addresses stored in association with the CFPs on TORs linked to host devices.

SUMMARY

In an aspect of the invention, a method comprises limiting MAC address information in a forwarding table in leaf switches of a local area networking system by learning, for each of the leaf switches, only MAC addresses from directly connected hosts.

In an aspect of the invention, a method comprises: receiving a data frame from a layer in a networking system; and determining whether the data frame was received from an uplink port: if not received from the uplink port, learning a MAC source address on a leaf switch; and if received from the uplink port, the MAC source address will not be learned on the leaf switch.

In an aspect of the invention, a method comprises: receiving a data frame from a downstream port of a leaf device in a networking system; and determining whether the data frame is a broadcast; if yes, the leaf device will flood to all ports on the networking system, received from an uplink port; if not a broadcast, then the method determines whether the leaf device has a MAC destination address learnt: if the MAC destination address is known, the method transmits the data frame on selected port associated with the MAC destination address; and if a MAC destination address is unknown, the method transmits determines that the data frame originated from a upstream port and floods the data frame to all host facing ports excluding the port where the source MAC address is learnt. If the source MAC address is not learnt, the switch will flood the data frame to all host facing ports.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The invention relates to networking systems and, more particularly, to processes of limiting MAC address information in a forwarding table in data center networking systems. More specifically, in embodiments, the systems and processes described herein provide a deterministic dimension for leaning MAC addresses which are to be used in forwarding tables. By learning only the MAC addresses from the directly connected hosts (which is known and limited by the number of servers in the chassis/rack) the total maximum number of MAC address in a forwarding table of a leaf device (e.g., leaf switch) is considerably reduced compared to conventional processes and techniques.

More specifically, the processes and systems described herein generally relate to MAC learning in an spine leaf type network, and specifically to limiting MAC address learning on leaf switches only to directly connected host MAC addresses. In this way, leaf switches no longer are required to learn MAC addresses from the rest of the network, e.g., hosts which are not directly connected.

In embodiments, the systems and processes described herein use a considerably smaller layer-2 hardware forwarding table in the leaf switches while maintaining the advantages of local switching. In this way, a significant cost reduction is achieved since smaller hardware tables are cheaper and most of the switches are leaf switches (large percentage of the total number). Also the maximum number of MAC address required to be supported on leaf switches can be computed easily from the maximum number of servers (physical/virtuals) supported by chassis/rack.

In order to achieve the advantages of the present invention:

(i) Each of the leaf uplinks ports are configured to not learn a MAC address;

(ii) Each of the leaf host facing ports (server ports) are configured to learn the source MAC address of unicast, broadcast and multicast data frames;

(iii) Each of the spine ports are configured to learn the source MAC address of unicast, broadcast and multicast data frames;

(iv) Whenever a spine switch detects a MAC migration event, it will notify the leaf switch to remove from its layer-2 forwarding table that MAC address;

(v) Upon reception of an unknown unicast frame from the host facing ports each leaf switch will transmit the frame on the uplink only; the frame will not be flooded locally;

(vi) Upon reception of an unknown unicast frame on a downstream port (connecting a leaf switch), each spine switch will flood the frame across all ports in VLAN and also back to the origination leaf switch (hairpin); and/or (vii) Upon reception of an unknown unicast frame from the uplink ports, each leaf switch will flood the frame on its host facing ports, except the port where the frame MAC source is learned.

Figure 1:
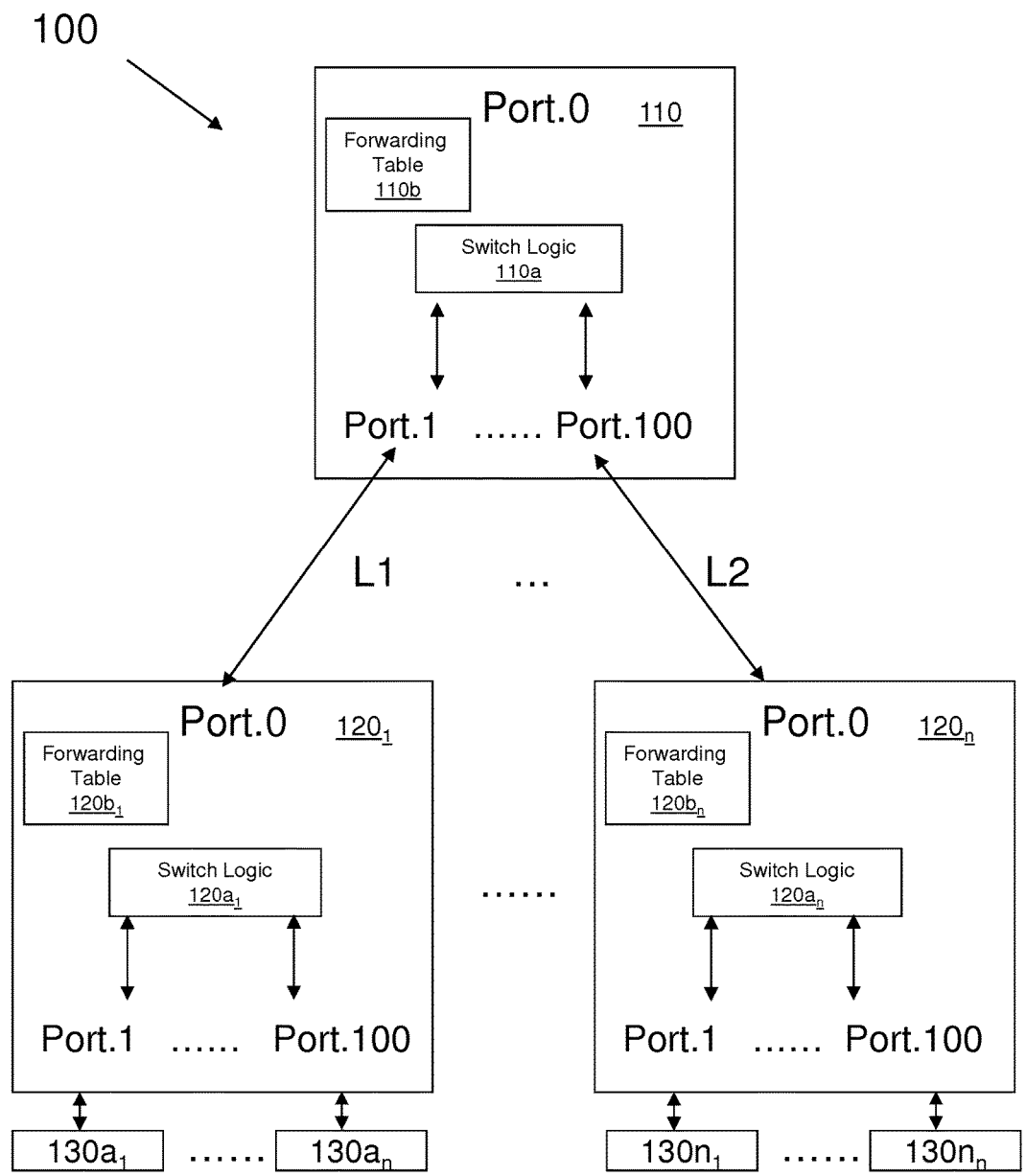
FIG. 1 shows a network topology that includes one spine device linked to a number of leaf devices each one or which is associated with one or more host devices (servers) in accordance with aspects of the invention.

FIG. 1 shows an exemplary network topology implementing processes in accordance with aspects of the invention. In embodiments, the network topology 100 can be representative of a LAN of a data center. In particular, the network topology 100 includes at least one spine device 110 linked to a plurality of leaf devices $120_1 \ldots 120_n$. The at least one spine device 110 and the leaf devices $120_1 \ldots 120_n$ can be network switches operating to send and receive data frames at the data link layer (L1, L2) and at the network layers (L3-L6).

In embodiments, the spine device 110 can be multiple spine switches for redundancy. Also, the leaf devices $120_1 \ldots 120_n$ can comprise hundreds of leaf switches; whereas, host devices (servers) $130a_1 \ldots 130a_n \ldots 130n_1 \ldots 130n_n$ linked directly to the respective plurality of leaf devices $120_1 \ldots 120_n$ can be thousands of host devices (servers). In embodiments, each of the plurality of leaf devices $120_1 \ldots 120_n$ can be directly linked to tens or more of host devices (servers), each of which can be configured to support several VMs.

The spine device 110 includes switch logic 110a and each of the plurality of leaf devices $120_1 \ldots 120_n$ includes switch logic $120a_1 \ldots 120a_n$. In embodiments, the switch logic is generally comprised of means to examine received data frames and determine how to forward the frames to their destinations. The switch logic 110a of the spine device 110 and the switch logic $120a_1 \ldots 120a_n$ of the plurality of leaf devices $120_1 \ldots 120_n$ can also include means to run network protocols which, among other things, operate to build and maintain forwarding tables (layer 2 and eventually layer 3) comprised of address information used by the switch to determine how to forward the frame to their destinations in accordance with aspects of the invention. In additional embodiments, the switch logic can include a switching fabric which operates to propagate each frame from the ingress port to an egress port in each of the devices, e.g., the spine device 110 and each of the plurality of leaf devices $120_1 \ldots 120_n$.

In embodiments, each of the leaf devices $120_1 \ldots 120_n$ and the spine device 110 include ingress ports and egress ports for receiving and transmitting data frames respectively. For example, the ingress ports and egress ports of the leaf devices $120_1 \ldots 120_n$ can receive and transmit data frames respectively to the spine device 110 and the host devices (servers) $130a_1 \ldots 130a_n$. By way of illustrative example, depending on the particular topology, each of the leaf devices $120_1 \ldots 120_n$ and the spine device 110 can include 101 or more ports (e.g., Port.0-Port.100); The single port (Port.0) of the leaf devices $120_1 \ldots 120_n$ are directly linked to the spine device 110; whereas, the single port (Port.0) of the spine 110 can be linked to an outside source, e.g., core network, Internet.

In embodiments, each of the respective leaf devices $120_1 \ldots 120_n$ include forwarding tables $120b_1 \ldots 120b_n$ and the spine device 110 includes forwarding table 110b. In implementations of the present invention, though, each of the forwarding tables $120b_1 \ldots 120b_n$ only learn the MAC address of a directly connected host, e.g., respective host devices (servers) $130a_1 \ldots 130a_n$, and no MAC address from the uplink ports such that the amount of switch memory that is dedicated to storing forwarding table address information can be drastically reduced.

In embodiments, each of the leaf host facing ports (server ports) are configured to learn the source MAC address of unicast, broadcast and multicast data frames. Also, whenever a spine switch 110 detects a MAC migration event, it will notify the leaf switch (e.g., leaf devices $120_1 \ldots 120_n$) to remove from its layer-2 forwarding table that MAC address. In comparison, the forwarding table 110b of the spine device 110 will include a full listing of MAC addresses for the entire network topology 100; that is, the forwarding table 110b of the spine device 110 will need to support all MAC addresses in the network.

More specifically, the ports on a leaf switch that are designated to be host connected ports are configured to learn the source MAC address of all data frames (unicast, multicast, broadcast) received over those ports only. (Hereinafter, this type of MAC learning is referred to as all-frame MAC learning.) And, the switches connected directly to host devices in a local network will no longer learn the MAC address of every other host device in a flat L2 network. In this way, the size requirements for the forwarding tables $120b_1 \ldots 120b_n$ of the respective leaf devices $120_1 \ldots 120_n$ can be easily determined knowing the number of host devices (servers) $130a_1 \ldots 130a_n$ directly linked to the respective leaf devices $120_1 \ldots 120_n$, as well as eventually the number of supported VMs per host (server). This approach has the effect of lowering the overall cost of the leaf switch and reducing the amount of power needed for the switch to operate, as the MAC address information stored in the forwarding table is considerably reduced.

By way of more specific example and referring to leaf switch $120_1$, port (Port.0) is designated to be an uplink port and is connected over link L1 to port (Port.1) of the spine switch 110. In embodiments, multiple physical links can be bundled together as Port Channel of LAG (link aggregation) and used as uplink port. Continuing with this example, ports of the leaf device $120_1$ are respectively linked to respective host devices (servers) $130a_1 \ldots 130a_1$, e.g., Port.0 of leaf device $120_1$ is designated to be a port (Port.1) facing the host (server) $130a_1$, labeled L3, port (Port.100) is designated to be a port facing device host (server) $130a_1$, labeled L4, etc. In embodiments, the ports on the leaf device $120_1$ that are designated to be host connected ports are configured to learn the source MAC address of all data frames (unicast, multicast, broadcast) received over those ports, only. And, the ports on the leaf device $120_1$ that are designated to be uplinks are configured to not learn any MAC addresses.

In the case that data frames are to be transmitted to a device host (server) not directly linked to the leaf switch, e.g., a MAC address not learned in its forwarding table, the leaf switch will transmit the data frames to the spine device 110 (which will have an entire table of MAC addresses in the network topology, similar to conventional switching techniques). The spine device 110, in turn, will transmit the data frames to an appropriate leaf device that includes the MAC address for transmitting the data frames to the appropriate host device. In this way, the leaf devices $120_1 \ldots 120_n$ can have significantly less computation power; compared to the spine device 110 which requires large computation power to process its forwarding table 110b with all of the MAC addresses.

Also, upon reception of an unknown unicast frame from the host facing ports each leaf switch will transmit the frame on the uplink only. Upon reception of an unknown unicast frame on a downstream port (connecting a leaf switch), each spine switch will flood the frame across all ports in the LAN and also back to the origination leaf switch (hairpin). And, upon reception of an unknown unicast frame from the uplink ports, each leaf switch will flood the frame on its host facing ports, except the port where the frame MAC source is learned.

Figure 2:
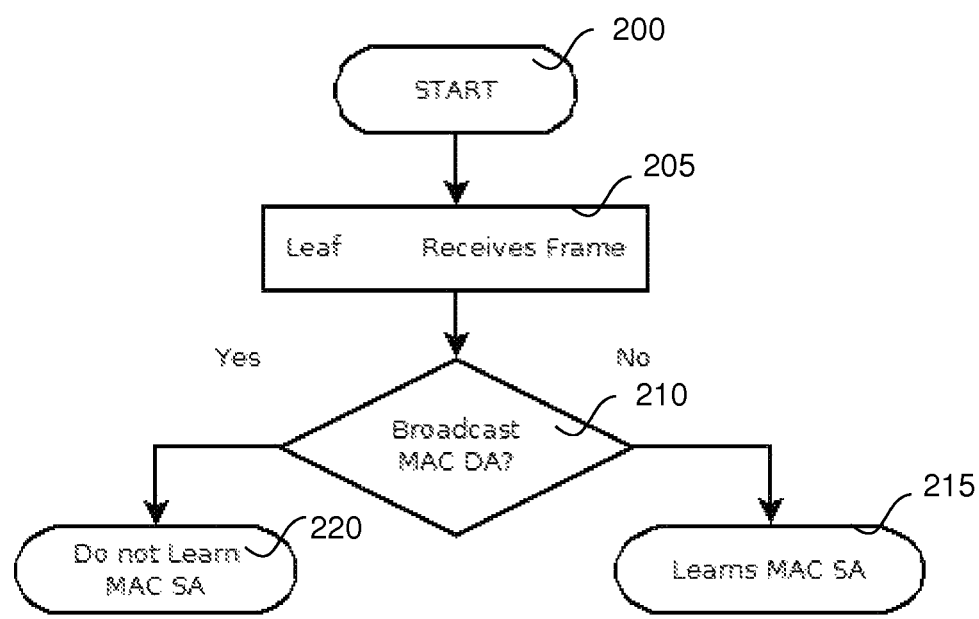
FIG. 2 shows a flow diagram depicting a process of learning an uplink port on a leaf device (switch) in accordance with aspects of the invention.

FIG. 2 shows a flow diagram depicting a process of learning an uplink port in accordance with aspects of the invention. At step 200, the processes start. At step 205, switch leaf 120n receives a data frame. At step 205, a determination is made as to whether the data frame was received from an uplink port. If not, at step 210, the leaf device (switch) will learn the MAC source address. If the data frame is received from the uplink port, then the leaf device (switch) will not learn the MAC source address. In embodiments, the leaf device (switch) will not learn the MAC source address because there is no direct connection. In this way, a leaf switch will learn the MAC address only if the data frame is received from a server port, with the MAC learning being disabled on the uplink port.

Figure 3:
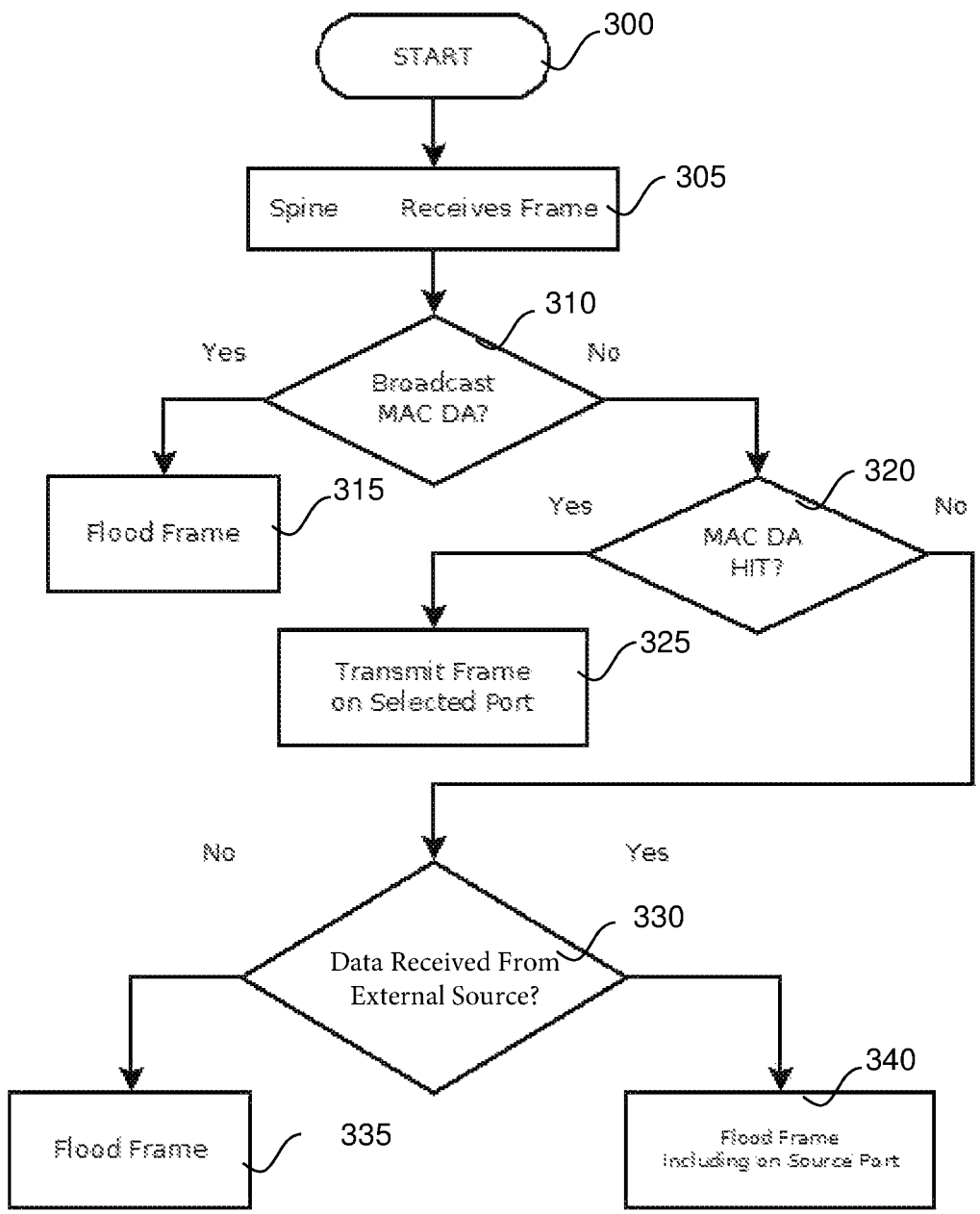
FIG. 3 shows a flow diagram depicting a process of forwarding a decision on a spine device (switch) in accordance with aspects of the invention.

FIG. 3 shows a flow diagram depicting a process forwarding a decision on a spine switch (110) in accordance with aspects of the invention. The processes begin at step 300. At step 305, a spine device (110) receives a data frame. At step 310, a determination is made as to whether the data frame destination MAC address is broadcast. If so, then the spine device will flood the network, e.g., send the data frame to all of the ports, at step 315. If the destination MAC address of the data frame is not a broadcast address, then the processes proceed to step 320, where a determination is made as to whether the spine device has the MAC destination address learned. If yes, at step 325, the data frame is transmitted on the selected port associated with the MAC destination address.

If there is no MAC destination address found, the processes proceed to step 330. At step 330, a determination is made as to whether the data frame originated on Port.0 of spine device, e.g., from outside of the data center or LAN. If the data frame originated from outside of the datacenter, e.g., from the Internet or other external source, at step 335, the processes will then flood the data frame to all destinations, excluding the source port (e.g., Port.0). If, on the other hand, the data frame originated from inside the datacenter or LAN, e.g., from an internal source (e.g., Port.1 . . . Port.100 shown in FIG. 1), at step 340, the spine device will flood the data frame to all destinations, including the source port.

Figure 4:
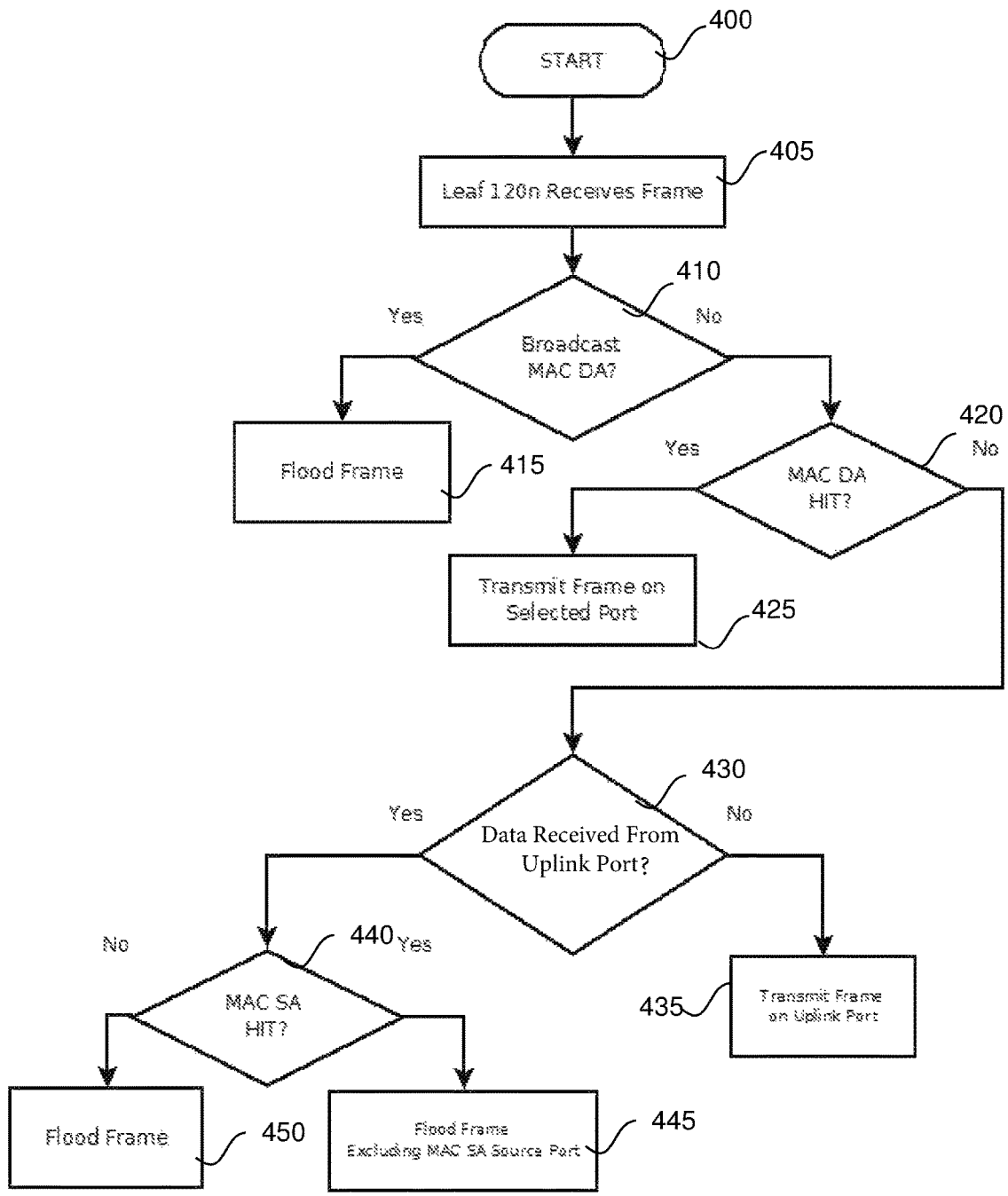
FIG. 4 shows a flow diagram depicting a process of forwarding a decision on a leaf device (switch) in accordance with aspects of the invention.

FIG. 4 shows a flow diagram depicting another technique of forwarding a decision on a leaf switch (120a) in accordance with aspects of the invention. In this technique, if a data frame is received on a downstream port, e.g., Port.1, and it is an unknown unicast, the leaf device, e.g., switch of the leaf device 120a of FIG. 1, will send the data frame to the uplink port only, and no flooding will be performed in this case. This approach will allow the networking system (spine and leaf switches) to preserve the advantages of local switching and to use ASIC having smaller L2 forwarding tables on the leaf switches. This approach will also provide a cost effective solution and also will require less power to operate.

The processes begin at step 400. At step 405, a leaf device (120n) receives a data frame. At step 410, a determination is made as to whether the data frame destination MAC address is broadcast. If so, then the leaf device will flood the network, e.g., send the data frame to all of the ports, at step 415. If the data frame destination MAC address is not broadcast, then the processes proceed to step 420, where a determination is made as to whether the leaf device has the MAC destination address learned. If yes, at step 425, the data frame is transmitted on the selected port associated with the MAC destination address.

If there is no MAC destination address found, the processes proceed to step 430. At step 430, a determination is made as to whether the data frame originated (received) from the uplink port. If the data frame did not originated from the uplink port, the processes will then transmit the data frame on the uplink port at step 435. If the data frame was originated from the uplink port, then a determination is made at step 440 as to whether the MAC source address is known (learned). If the MAC source address is known, then the data frame is flooded to all host facing ports excluding the port where the MAC source address is learnt, at step 445. If MAC source address is not learned, otherwise the frame is flooded on all host facing at step 450.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method for operating a local area networking system comprising: limiting a number of media access control (MAC) addresses in a forwarding table in each of a plurality of leaf switches comprising the local area networking system, connected to one another by a spine switch, by learning, for each of the leaf switches, only MAC addresses from directly connected hosts.

2. The method of claim 1, wherein the learning comprises limiting MAC address learning on the leaf switches only to directly connected host MAC addresses.

3. The method of claim 1, wherein each of the leaf switches do not learn MAC addresses from hosts which are not directly connected thereto.

4. The method of claim 1, wherein each host is comprised of at least one of physical and virtual machine servers, and wherein a maximum number of MAC addresses required to be supported on the leaf switches is computed from a maximum number of physical and virtual machine servers supported by a chassis/rack in which the physical and virtual machine servers are located.

5. The method of claim 1, wherein each leaf uplink port of the leaf switches connected to the spine switch do not learn a MAC address from the spine switch.

6. The method of claim 1, wherein each leaf host facing ports of the leaf switches learn a source MAC address of unicast, broadcast and multicast data frames.

7. The method of claim 6, wherein the spine switch includes a spine port configured to learn the source MAC address of unicast, broadcast and multicast data frames.

8. The method of claim 7, wherein when a spine switch detects a MAC migration event regarding migration of a MAC address, it will notify a leaf switch to remove from its layer-2 forwarding table that MAC address.

9. The method of claim 7, wherein the spine device will learn all destination MAC addresses for a network topology and populate its forwarding table therewith.

10. The method of claim 1, wherein, upon reception of an unknown unicast frame from host facing ports, each leaf switch will transmit the unicast frame on an uplink port only.

11. The method of claim 10, wherein, upon reception of an unknown unicast frame on a downstream port connecting a leaf switch, each spine switch will flood the unicast frame across all ports in the local area networking system and also back to an origination leaf switch.

12. The method of claim 1, wherein, upon reception of an unknown unicast frame from uplink ports, each leaf switch will flood the unicast frame on its host facing ports, except a port where a MAC source of the frame is learned.

13. A method comprising:
receiving a data frame from a layer in a networking system; and
determining whether the data frame was received from an uplink port of one of a plurality of leaf switches, which uplink port is coupled to a spine switch connected to each of the plurality of leaf switches:
if not received from the uplink port, learning a media access control (MAC) source address on the one of the plurality of leaf switches; and
if received from the uplink port, the MAC source address will not be learned on the one of the plurality of leaf switches.

14. The method of claim 13, further comprising:
receiving the data frame at the spine switch; and
flooding the networking system when the data frame is not a broadcast.

15. The method of claim 14, further comprising determining that the spine switch has a MAC destination address learned and transmitting the data frame on selected port associated with the MAC destination address where the data frame is not a broadcast.

16. The method of claim 15, wherein:
when there is no MAC destination address found, determine that the data frame originated on a port connected to sources outside of the networking system and flooding the data frame to all destinations, excluding a source port of the spine device; and
when the data frame originated from inside the networking system, the spine device floods the data frame to all destinations, including the source port.

17. The method of claim 13, further comprising limiting MAC address information in a forwarding table in leaf switches of the networking system by learning, for each of the leaf devices, only MAC addresses from directly connected hosts.

18. A method comprising:
receiving a data frame from a downstream port of a leaf device in a networking system, wherein the leaf device is one of a plurality of leaf devices connected to one another by a spine switch; and
determining whether the data frame is a broadcast;
if yes, the leaf device will flood to all ports on the networking system, received from an uplink port;

if the data frame is not a broadcast, then determining whether the leaf device has a media access control (MAC) destination address learned:
if a MAC destination address is known, transmitting the data frame on a selected port associated with the MAC destination address;
if a MAC destination address is unknown, determining that the data frame originated from a upstream port on the leaf device and flood the data frame to all host facing ports connected to the leaf device excluding the port where the source MAC address is learnt; and
if the source MAC address is not learnt by the leaf device, the leaf device will flood the data frame to all host facing ports.

19. The method of claim 18, wherein:
on the spine switch when an unknown unicast data frame is received on the downstream port, flood the frame across all ports in the networking system including a source port; and
when an unknown unicast data frame is received not on the downstream port, the switch will flood the frame across all ports excluding the source port.

20. The method of claim 18, further comprising limiting MAC address information in a forwarding table in leaf switches of the networking system by learning, for each of the leaf devices, only MAC addresses from directly connected hosts.

* * * * *